United States Patent [19]
Troise

[11] Patent Number: 6,140,869
[45] Date of Patent: Oct. 31, 2000

[54] DEVICE FOR DEMODULATING A BINARY PHASE-SHIFT KEYED SIGNAL

[75] Inventor: Cyril Troise, Beziers, France

[73] Assignee: STMicroelectronics S.A., Gentilly, France

[21] Appl. No.: 09/234,194

[22] Filed: Jan. 20, 1999

[30] Foreign Application Priority Data

Jan. 21, 1998 [FR] France .................................. 98 00584

[51] Int. Cl.$^7$ .................................................. H04L 27/22
[52] U.S. Cl. .......................... 329/307; 329/310; 375/327; 375/328
[58] Field of Search ...................................... 329/304, 306, 329/307, 310; 375/324, 325, 326, 327, 328

[56] References Cited

U.S. PATENT DOCUMENTS 3,852,811  12/1974  Aghazadeh ................................ 360/51

FOREIGN PATENT DOCUMENTS

| 0 576 826 | 1/1994 | European Pat. Off. . |
| 0 762 628 | 3/1997 | European Pat. Off. . |
| 2 265 140 | 10/1975 | France . |
| 2 308 948 | 7/1997 | United Kingdom . |

Primary Examiner—Siegfried H. Grimm
Attorney, Agent, or Firm—Theodore E. Galanthay; Stephen C. Bongini; Fleit, Kain, Gibbons, Gutman & Bongini P.L.

[57] ABSTRACT

A device for demodulating a binary signal having a predetermined carrier frequency and phase-modulated by encoded pulses. The device includes a phase-locked loop circuit having a phase comparator followed by a low-pass filter and a voltage-controlled oscillator, which is voltage-controlled by the output of the filter. The voltage-controlled oscillator outputs a binary signal that is synchronous with the modulated signal and at a frequency N times the carrier frequency. The phase-locked loop circuit also includes a divider that divides by N the output signal of the oscillator and supplies the divided signal to one input of the phase comparator. Thus, a binary signal synchronous with the modulated signal and having a frequency equal to the carrier frequency is supplied to one input of the phase comparator. The other input of the phase comparator receives the modulated signal. Further, the output of the oscillator is supplied as a clock signal to a first binary counter so as to measure the duration of high levels of the modulated signal, and to a second counter so as to measure the duration of low levels of the modulated signal. The counters are used to detect phase changes in the modulated signal at the two levels. The demodulation device of the present invention is particularly suited for use in the transmission of data between a contactless-type smart card and a system having a reader for such cards.

23 Claims, 3 Drawing Sheets

DEVICE FOR DEMODULATING A BINARY PHASE-SHIFT KEYED SIGNAL

CROSS-REFERENCE TO RELATED APPLICATIONS

This application is based upon and claims priority from prior French Patent Application No. 98-00584, filed Jan. 21, 1998, the entire disclosure of which is herein incorporated by reference.

BACKGROUND OF THE INVENTION

1. Field of the Invention

The present invention relates to digital systems, and more specifically to a device for demodulating a binary phase-shift keyed signal.

2. Description of Related Art

The phase modulation of a signal using encoded pulses is known as phase-shift keying ("PSK") modulation, and when the carrier is a binary signal it is termed binary phase-shift keying ("BPSK") modulation. In BPSK-type modulation, the carrier is a high frequency binary signal and the modulating signal is a low frequency binary signal that has a series of transitions between a high level and a low level for representing an encoded sequence of 0's and 1's. The resultant BPSK modulated signal is a binary signal in which each change in phase corresponds to a downward transition (i.e., from high level to low level) or an upward transition (i.e., from low level to high level) of the modulating signal.

FIG. 1 shows an example of a modulating binary signal $S_m(t)$ with a non-return to zero ("NRZ") type of encoding. As shown, each 1 bit is encoded as a high level for a predetermined period $t_m$ and each 0 bit is encoded as a low level for the same period $t_m$. The high level and the low level are at +V and −V, respectively. The BPSK modulated signal $S_{PSK}(t)$ that results when using a carrier at a frequency of $f_p$ is shown in FIG. 2. In a practical example, the modulating signal is at a frequency $f_m$ of 105.9 KHz and the carrier signal is at a frequency $f_p$ of 847 KHz (i.e., $f_p$ is a multiple of $f_m$ to allow coherent modulation). Typically, the first phase change in the modulated signal corresponds to a first downward transition equivalent to an initial bit.

To demodulate such a binary phase-shift keyed signal, the changes in phase in a received BPSK modulated signal must be detected and used to regenerate a demodulated signal that corresponds to the original modulating signal. However, conventional analog-type BPSK demodulation devices use mixers that are extremely bulky and subject to drifts. Additionally, such analog devices are difficult to implement in practice. While it is possible to use an exclusive-or-type digital device and delay circuits, such devices are highly dependent on the modulation frequency (i.e., they must be adapted for each different modulation frequency).

SUMMARY OF THE INVENTION

In view of these drawbacks, it is an object of the present invention to remove the above-mentioned drawbacks and to provide a binary phase-shift keyed demodulation device that detects phase changes in a high frequency modulated signal, shows little sensitivity to drifts (in temperature and manufacturing method), and operates for a wide range of modulation frequencies.

One embodiment of the present invention provides a phase-locked loop demodulation device which includes a phase comparator, a filter, and a voltage-controlled oscillator. The oscillator delivers a binary signal that is synchronous with the modulated signal and has a frequency equal to N times the carrier frequency. The phase-locked loop also includes a divider that divides by N the output of the oscillator before supplying it to one input of the phase comparator. Further, the output signal of the oscillator is used as the clock signal for a first counter for measuring the duration of high levels in the modulated signal and as a clock signal for a second counter for measuring the duration of low levels in the modulated signal. The output of the first counter provides a high level phase change detection signal when the count reaches a predetermined number, and the output of the second counter provides a low level phase change detection signal when the count reaches a predetermined number. The two phase change detection signals are supplied to an RS-type flip-flop, and the output of the flip-flop provides a demodulated signal.

In a preferred embodiment, if a high level phase change in the modulated signal corresponds to a downward transition of the modulating signal and a low level phase change in the modulated signal corresponds to an upward transition of the modulating signal, then the high level detection signal is supplied to the zero-setting input of the flip-flop and the low level detection signal is supplied to the one-setting input of this flip-flop. On the other hand, if the correspondence is reversed, the low level detection signal is supplied to the zero-setting input and the high level detection signal is supplied to the one-setting input of the flip-flop. Further, in order to improve operation under temperature drifts and drifts due to variations inherent in manufacturing, it is preferred that the low-pass filter of the phase-locked loop has oversized resistors and capacitors. The demodulation device of the present invention is particularly suited for use in the transmission of data between a contactless-type smart card and a system having a reader for such cards.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawing.

Figure 1:
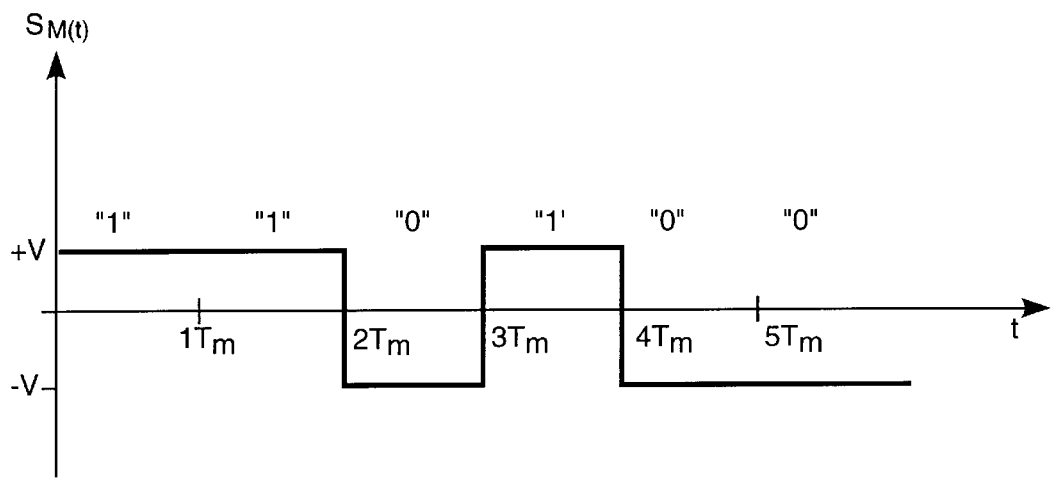
FIG. 1 is a timing diagram showing an example of a modulating signal with NRZ-type encoding.
Figure 2:
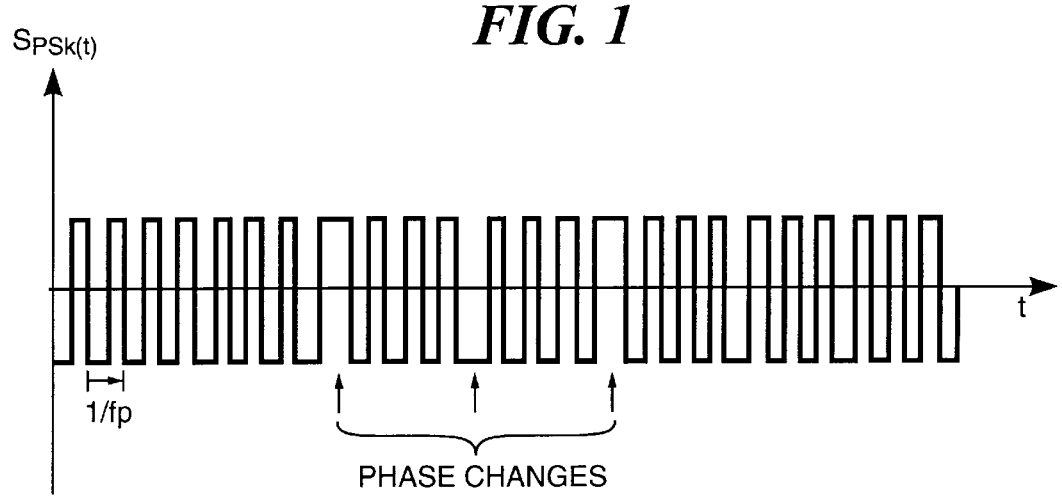
FIG. 2 is a timing diagram showing the BPSK modulated signal corresponding to the modulating signal of FIG. 1.
Figure 5:
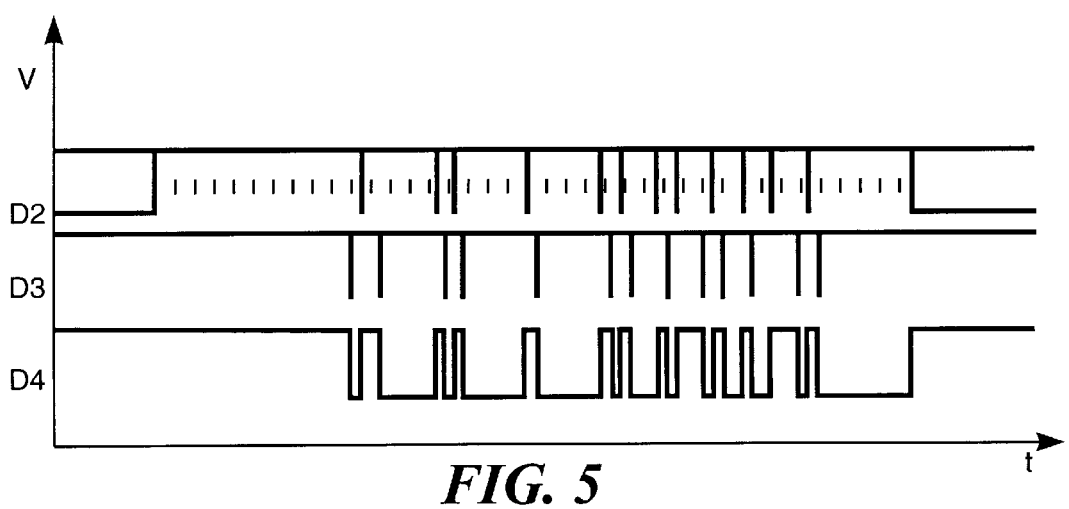
FIG. 5 is a timing diagram showing another exemplary sequence of the detection signals and the corresponding demodulated signal output by the flip-flop.
Figure 3:
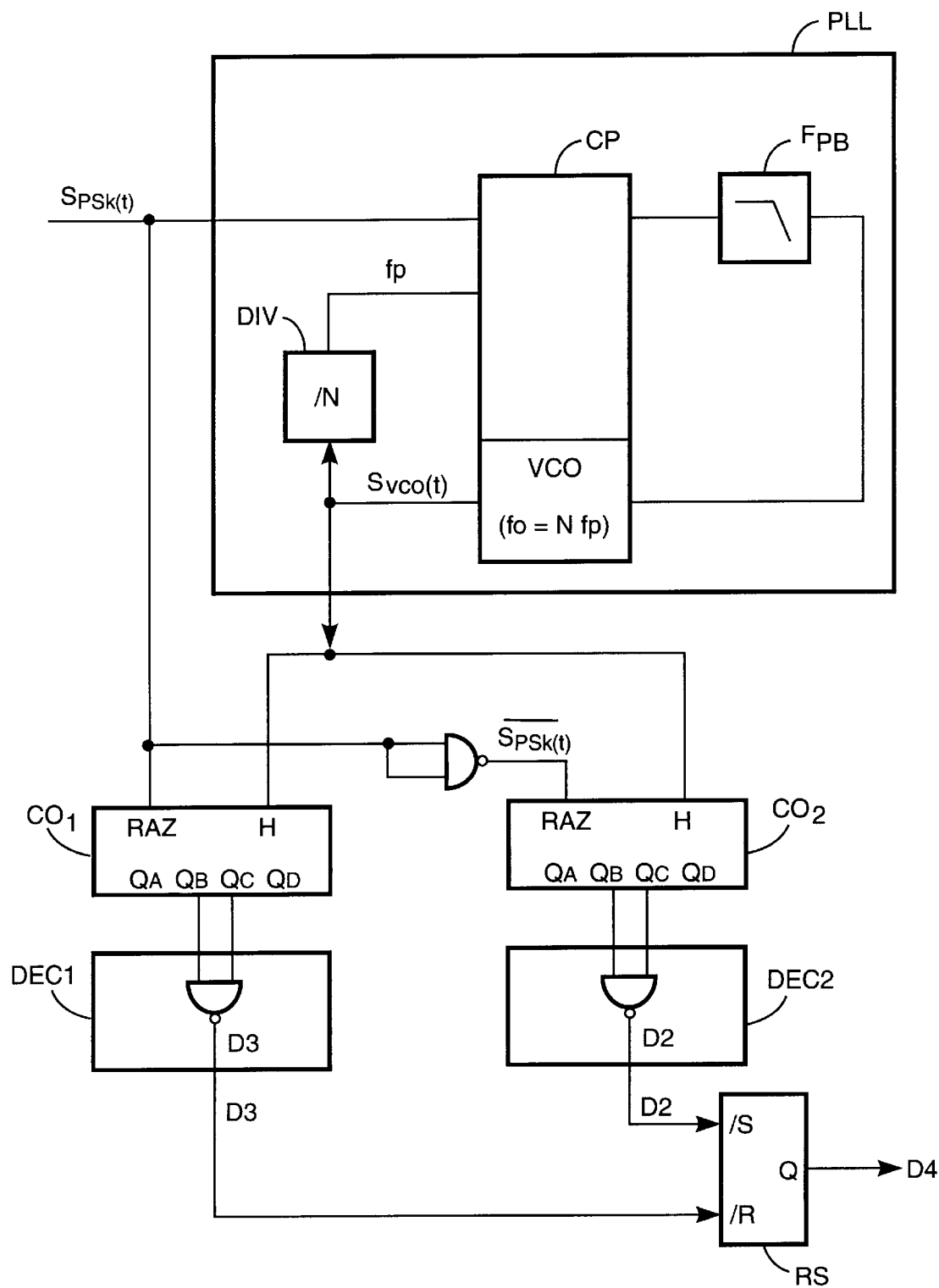
FIG. 3 is a block diagram showing a BPSK demodulation device according to a preferred embodiment of the present invention.

FIG. 3 shows a binary phase-shift keyed ("BPSK") signal demodulation device according to a preferred embodiment of the present invention. As shown, the demodulation device includes a phase-locked loop circuit PLL having a phase comparator CP followed by a low-pass filter $F_{PB}$ and then a voltage-controlled oscillator VCO, which is controlled by the output of the filter. The output of the voltage-controlled oscillator is supplied to a divider DIV that divides by N. The output of the divider DIV is supplied to one input I2 of the phase comparator CP, and the modulated signal $S_{PSK}(t)$ is supplied to the other input I1 of the phase comparator CP.

During operation, when the phase-locked loop circuit PLL is locked, the oscillator VCO outputs a synchronous binary signal $S_{VCO}(t)$ having a frequency $f_O$ equal to N times the carrier frequency $f_p$ of the modulated signal $S_{PSK}(t)$ (with N≠1). Thus, the frequency $f_p$ of the signal output by the divider is the same as the carrier frequency, and a synchronous signal having the same frequency as the carrier frequency $f_p$ is supplied to the input I2 of the comparator. The demodulation device also includes a first counter $CO_1$ that measures the durations of the high levels in the modulated signal, and a second counter $CO_2$ that measures the durations of the low levels in the modulated signal.

More specifically the modulated signal $S_{PSK}(t)$ is supplied to the zero-setting input $R_{AZ}$ of the first counter $CO_1$ and the output signal $S_{VCO}(t)$ of the oscillator VCO (with a frequency of $f_O = N \times f_p$) is supplied to the clock input H of the first counter $CO_1$. Thus, the low levels in the modulated signal $S_{PSK}(t)$ reset the first counter to zero and the oscillator output pulses $f_O$ are counted during high levels in the modulated signal. Consequently, the outputs $Q_A$, $Q_B$, $Q_C$, and $Q_D$ of the first counter indicate the number of oscillator output pulses $f_O$ counted for each high level in the modulated signal.

Similarly, an inverted form of the modulated signal $/S_{PSK}(t)$ is supplied to the zero-setting input $R_{AZ}$ of the second counter $CO_2$ and the output signal $S_{VCO}(t)$ of the oscillator VCO (with a frequency of $f_O = N \times f_p$) is supplied to the clock input H of the second counter $CO_2$. Thus, the high levels in the modulated signal $S_{PSK}(t)$ reset the second counter to zero and the oscillator output pulses $f_O$ are counted during low levels in the modulated signal. Consequently, the outputs $Q_A$, $Q_B$, $Q_C$, and $Q_D$ of the second counter indicate the number of oscillator output pulses $f_O$ counted for each low level in the modulated signal.

In the illustrated embodiment, the output of each of the counters is applied to a decoder that detects phase changes. Because a phase change causes the duration of one of the levels of the modulated signal to be twice the normal duration, each decoder detects a phase change by decoding a specified number of pulses (i.e., count). For example, in an embodiment in which N=8 and thus $f_O = 8 \times f_p$, the normal duration of a high (or low) level of the modulated signal $S_{PSK}(t)$ corresponds to four pulses of the oscillator output signal $S_{VCO}(t)$, which is at a frequency of $f_O$. When there is a phase change, the high (or low) level lasts twice that long (i.e., an additional half-period) so as to correspond to eight pulses of the oscillator output signal $S_{VCO}(t)$. However, in practical applications error can be introduced into the modulated signal so a decoder cannot properly detect phase changes by simply determining when a level lasts for more than four pulses.

In the example in which N=8, it can be reliably determined that a phase change has occurred when the decoder has counted at least 6 or 7 pulses. This gives the detection threshold to be used in practical embodiments. If the detection threshold is set at 6, it is sufficient to decode only the second and third outputs QB and QC of a counter to determine when both these outputs are 1 (i.e., to detect a counter output of x11x). For this purpose, a NAND gate is provided in each of the decoders in the illustrated embodiment. As soon as six pulses of the oscillator output signal have been counted, the decoder outputs a phase change detection pulse for the corresponding level of the modulated signal.

In particular, the second and third outputs $Q_B$ and $Q_C$ of the first counter $CO_1$ are supplied to a first decoder DEC1 that has a NAND gate for detecting high level phase changes and outputting the high level phase change detection signal D3 in response. Similarly, the second and third outputs $Q_B$ and $Q_C$ of the second counter $CO_2$ are supplied to a second decoder DEC2 that has a NAND gate for detecting low level phase changes and outputting the low level phase change detection signal D2 in response. In further embodiments, the pulse counting and decoding is performed with alternative circuitry. For example, in one embodiment a decoded decimal output counter with a zero-setting input $R_{AZ}$ is used so the counter directly outputs the phase change detection signal without the need for additional logic. In general, the output of each counter is used, directly or with additional logic, to provide a phase change detection signal.

Additionally, the demodulation device includes a circuit that generates a demodulated signal D4 on the basis of the two phase change detection signals D2 and D3. The phase change detection signals are used to change the output of the circuit to between the high and low levels. For example, if a high level phase change in the modulated signal $S_{PSK}(t)$ corresponds to a downward transition in the modulating signal $S_m(t)$ and a low level phase change in the modulated signal $S_{PSK}(t)$ corresponds to an upward transition in the modulating signal $S_m(t)$, the high level phase change detection signal D3 is used to set the demodulated signal to 0 and the low level phase change detection signal D2 is used to set the demodulated signal to 1.

Figure 4:
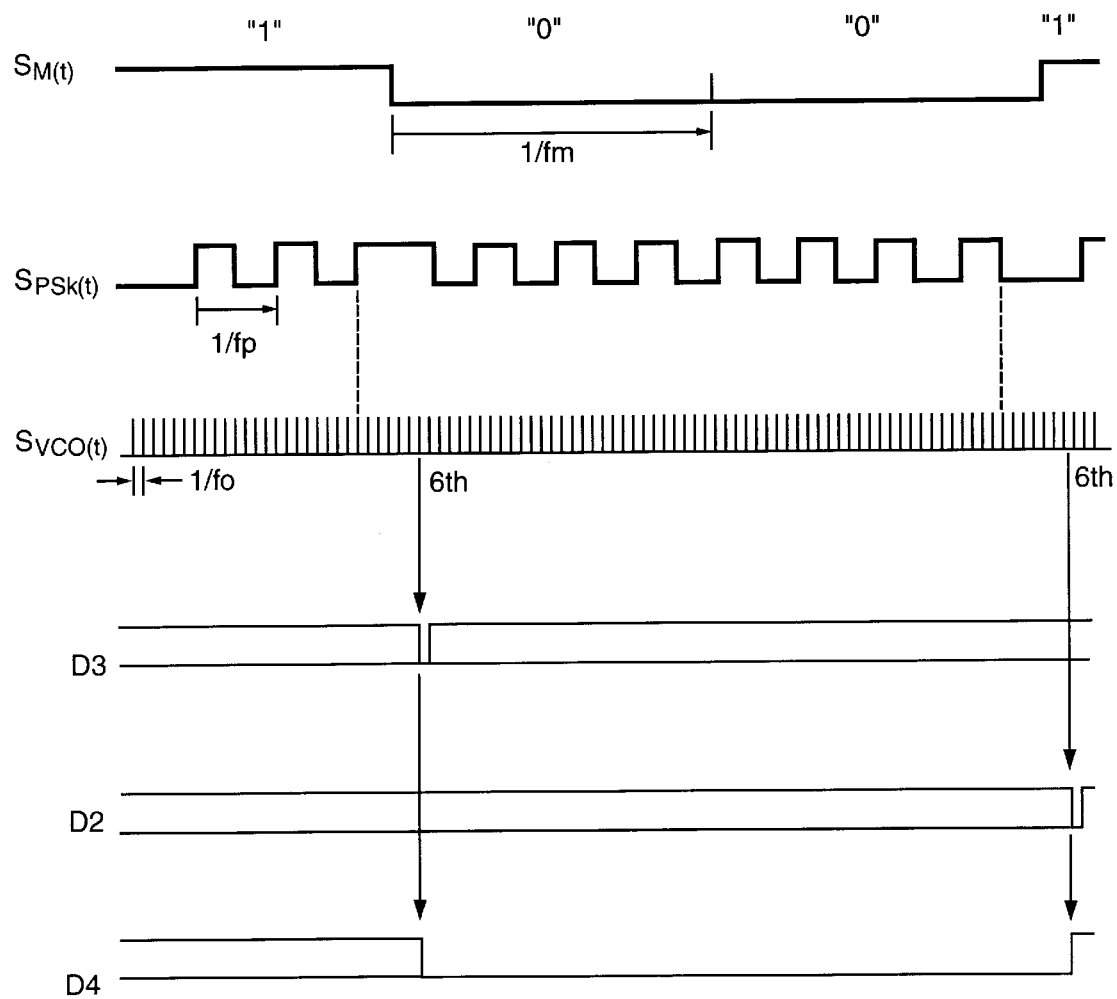
FIG. 4 is a timing diagram showing an exemplary sequence of a modulating signal, the corresponding modulated signal, the output of the voltage-controlled oscillator, the phase change detection signals, and the corresponding demodulated signal.

In the illustrated embodiment, the demodulated signal generation circuit is an RS-type flip-flop RS. As shown in FIG. 3, the zero-setting input /R of the flip-flop receives the high level phase change detection signal D3 and the one-setting input /S of the flip-flop receives the low level phase change detection signal D2. The flip-flop RS outputs the expected demodulated signal D4 from the two phase change detection signals, as shown in FIG. 4. The illustrated embodiment applies to cases in which the high level phase change detection signal D3 corresponds to a downward transition and the low level phase change detection signal D2 corresponds to an upward transition. In cases in which these relations are reversed, the demodulation device is altered so that the low level phase change detection signal D2 is supplied to the zero-setting setting input of the flip-flop and the high level phase change detection signal D3 is supplied to the one-setting input of the flip-flop.

In practice, it has been shown that a demodulation device according to an embodiment of the present invention works for a very wide range of modulation frequencies that corresponds to the locking range of the phase-locked loop circuit. For example, in an embodiment that used a carrier frequency of 847 KHz, the demodulation device worked in a range of locking frequencies of the phase-locked loop circuit of from 620 KHz to 1.15 MHz. Furthermore, by using oversized resistors and capacitors in the low-pass filter of the phase-locked loop circuit (e.g., in a ratio of 10), improvement is obtained in the behavior of the device under drifts in temperature and manufacturing method, for no element of the demodulation device is critical.

The demodulation device of the present invention can be used with all types of binary encoding that can be used for the modulating signal. That is, the particular coding used does not have any affect on the device of the present invention because it uses the detection of the changes in phase. While the demodulation device of the present invention can be used in many applications, it is particularly suited for use in the transmission of data between a contactless-type smart card and an application specific system that includes a reader for such cards. One application of this kind incorporates a demodulation device according to the present invention into the card reading system.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Furthermore, embodiments of the present invention may not include all of the features described above. Therefore it is intended that the present invention not be limited to the particular embodiments disclosed, but that the invention include all embodiments falling within the scope of the appended claims.

What is claimed is:

1. A demodulation device for demodulating a binary phase-shift keyed signal having a carrier frequency, said demodulation device including a phase-locked loop comprising:
    a phase comparator having one input that receives the binary phase-shift keyed signal;
    a voltage-controlled oscillator coupled to the phase comparator, the voltage-controlled oscillator outputting a synchronous binary signal having a frequency that is N times the carrier frequency;
    a divider for dividing by N the synchronous binary signal to generate a divided binary signal having a frequency equal to the carrier frequency, the divided binary signal being supplied to another input of the phase comparator; and
    at least one counter that uses the synchronous binary signal to measure periods of levels of the binary phase-shift keyed signal,
    wherein said at least one counter comprises:
        a first counter that uses the synchronous binary signal to measure periods of high levels of the binary phase-shift keyed signal; and
        a second counter that uses the synchronous binary signal to measure periods of low levels of the binary phase-shift keyed signal.

2. The demodulation device as defined in claim 1, wherein said first counter has a clock input that receives the synchronous binary signal and is reset based on levels of the binary phase-shift keyed signal.

3. The demodulation device as defined in claim 2, further comprising at least one detection circuit that generates at least one phase change detection signal when said at least one counter counts to a predetermined number.

4. The demodulation device as defined in claim 3, further comprising a signal reconstruction circuit that generates a demodulated signal based on said at least one phase change detection signal.

5. The demodulation device as defined in claim 1, further comprising:
    a first detection circuit that generates a first phase change detection signal when the first counter counts to a first predetermined number; and
    a second detection circuit that generates a second change detection signal when the second counter counts to a second predetermined number.

6. The demodulation device as defined in claim 5, further comprising a signal reconstruction circuit that generates a demodulated signal based on the first and second phase change detection signals.

7. The demodulation device as defined in claim 5, wherein the first predetermined number is the same as the second predetermined number.

8. The demodulation device as defined in claim 1, further comprising a low-pass filter coupled to the phase comparator, the low-pass filter having oversized capacitors and resistors.

9. A device for demodulating a binary signal having a carrier frequency and phase-modulated by encoded pulses of a modulating signal said device comprising:
    a phase-locked loop circuit including:
        a phase comparator having one input that receives a modulated signal;
        a low-pass filter;
        a voltage-controlled oscillator, the voltage-controlled oscillator generating an output binary signal synchronous with the modulated signal and having a frequency that is N times the carrier frequency; and
        a divider for dividing by N the output binary signal of the oscillator so as to supply to another input of the phase comparator a divided binary signal synchronous with the modulated signal and having a frequency equal to the carrier frequency;
    a first counter having a clock input that receives the output binary signal of the oscillator so as to measure the duration of high levels of the modulated signal; and
    a second counter having a clock input that receives the output binary signal of the oscillator so as to measure the duration of low levels of the modulated signal.

10. The device as defined in claim 9,
    wherein the output of the first counter is used to provide a high level phase change detection signal for phase changes at the high level of the modulated signal, and
    the output of the second counter is used to provide a low level phase change detection signal for phase changes at the low level of the modulated signal.

11. The device as defined in claim 10,
    wherein the high level phase change detection signal is generated when the first counter counts to a first predetermined number, and
    the low level phase change detection signal is generated when the second counter counts to a second predetermined number.

12. The device as defined in claim 11, wherein the first predetermined number is the same as the second predetermined number.

13. The device as defined in claim 10, further comprising a flip-flop having a zero-setting input that receives one of the phase change detection signals and a one-setting input that receives the other of the phase change detection signals, the output of the flip-flop providing the demodulated binary signal.

14. The device as defined in claim 9, wherein N is equal to 8.

15. The device as defined in claim 9, wherein the low-pass filter has oversized capacitors and resistors.

16. A smart card reader including a demodulation device that receives a binary phase-shift keyed signal having a carrier frequency, said demodulation device comprising:
- a phase comparator having one input that receives the binary phase-shift keyed signal;
- a voltage-controlled oscillator coupled to the phase comparator, the voltage-controlled oscillator outputting a synchronous binary signal having a frequency that is N times the carrier frequency;
- a divider for dividing by N the synchronous binary signal to generate a divided binary signal having a frequency equal to the carrier frequency, the divided binary signal being supplied to another input of the phase comparator; and
- at least one counter that uses the synchronous binary signal to measure periods of levels of the binary phase-shift keyed signal,
- wherein said at least one counter comprises:
  - a first counter that uses the synchronous binary signal to measure periods of high levels of the binary phase-shift keyed signal; and
  - a second counter that uses the synchronous binary signal to measure periods of low levels of the binary phase-shift keyed signal.

17. The smart card reader as defined in claim 16, wherein said first counter has a clock input that receives the synchronous binary signal and is reset based on levels of the binary phase-shift keyed signal.

18. The smart card reader as defined in claim 17, further comprising at least one detection circuit that generates at least one phase change detection signal when said at least one counter counts to a predetermined number.

19. The smart card reader as defined in claim 18, further comprising a signal reconstruction circuit that generates a demodulated signal based on said at least one phase change detection signal.

20. The smart card reader as defined in claim 16, wherein the reader is a contactless-type smart card reader.

21. A method for demodulating a binary phase-shift keyed signal having a carrier frequency, said method comprising the steps of:
- receiving the binary phase-shift keyed signal;
- generating a synchronous binary signal having a frequency that is N times the carrier frequency;
- counting pulses of the synchronous binary signal to measure periods of levels of the binary phase-shift keyed signal;
- generating a first phase change detection signal when the period of a high level of the binary phase-shift keyed signal exceeds a threshold;
- generating a second phase change detection signal when the period of a low level of the binary phase-shift keyed signal exceeds a threshold; and
- generating a demodulated signal from the first and second phase change detection signals.

22. The method as defined in claim 21, wherein in the step of generating a demodulated signal, the level of the demodulated signal is changed each time a phase change detection signal is generated.

23. The method as defined in claim 21, wherein the step of generating a synchronous binary signal includes the sub-steps of:
- dividing by N the synchronous binary signal to generate a divided binary signal having a frequency equal to the carrier frequency;
- comparing the phase of the binary phase-shift keyed signal with the phase of the divided binary signal; and
- controlling the generation of the synchronous binary signal based on the phase comparison.

* * * * *